(12) United States Patent  (10) Patent No.: US 6,175,070 B1
Naples et al.  (45) Date of Patent: Jan. 16, 2001

(54) SYSTEM AND METHOD FOR VARIABLE MUSIC NOTATION

(75) Inventors: Bradley J. Naples, Hanover, NH (US); Bert Snow, Newburyport, MA (US); Thomas Zack, Haverhill, MA (US); John Paquette, Arlington, MA (US); Robert Ferry, Winchester, MA (US)

(73) Assignee: MusicPlayground Inc., Andover, MA (US)

( * ) Notice: Under 35 U.S.C. 154(b), the term of this patent shall be extended for 0 days.

(21) Appl. No.: 09/506,219

(22) Filed: Feb. 17, 2000

(51) Int. Cl.[7] .............................. G09B 15/04; G10H 1/26

(52) U.S. Cl. ....................... 84/609; 84/470 R; 84/477 R

(58) Field of Search ................... 84/609–614, 634–638, 84/470 R, 477 R, 478

(56) References Cited

U.S. PATENT DOCUMENTS 5,491,297 * 2/1996 Johnson et al. ...................... 84/609

* cited by examiner

*Primary Examiner*—Stanley J. Witkowski
(74) *Attorney, Agent, or Firm*—Fish & Richardson P.C.

(57) ABSTRACT

A control program tangibly stored on a digital storage medium for use with a music system is configured to cause a digital processor to carry out the following functions. It causes the processor to (1) support a plurality of user selectable display formats each of which presents a different representation of the stored musical score when the stored musical score is being played, each of the plurality of display formats indicating to the user when actuation signals signals should be generated to cause an audio component to produce corresponding sounds of the stored musical score; (2) respond to a selection signal from the user identifying a selected one of the plurality of user-selectable display formats; and (3) display the stored musical score using the selected display format.

8 Claims, 2 Drawing Sheets

SYSTEM AND METHOD FOR VARIABLE MUSIC NOTATION

TECHNICAL FIELD

This invention relates to microprocessor-assisted musical instruments, and more particularly to visually displayed assistance that is provided in such systems.

BACKGROUND

In recent years an increasing number of microprocessor-based music systems have appeared in the marketplace that enable people who have no formal training in music to use an "instrument" to produce music as though they were a trained musician. Some of these systems store a musical score in digital form and play it back in response to input signals generated by the user when the "instrument" or some type of actuator that is attached to the system is played. Since the musical score is stored in the system ready to be played back, the user need not have the ability to create the required notes of the melody but need only have the ability to recreate the rhythm of the particular song or music being played. Such systems are making music much more accessible to everybody.

An example of one such system is described in U.S. Pat. No. 5,491,297, which is entitled "Music Instrument Which Generates A Rhythm EKG" and which is owned by the assignee of record in the present application. In that system, a user plays a MIDI instrument (e.g. MIDI guitar) to generate actuation signals. The computer then maps the actuation signals to notes of a stored musical score. The pitch and tonal quality of the note that is generated is controlled entirely by the stored musical score and not the user or the instrument being played. For each stored note of the musical score there is a window of time as measured from the beginning of the score (i.e., when the music system is started) during which the user must generate an actuation signal in order to produce that particular note. For any given note in the musical score, if the user fails to generate the actuation signal within the corresponding window of time, the opportunity to do so will pass and the user will miss that note. Thus, as long as the user generates the actuation signals with approximately the correct timing, the system will reproduce all of the notes of the stored musical score. And it will appear as though the user is really playing the instrument. To assist the user in achieving the correct timing in generating the required sequence of actuation signals there is a visual display of a trace that shows when the signals are supposed to be produced.

SUMMARY

In general, in one aspect, the invention is a musical instrument in which the visual display that aids the user in playing music on the system has a user-selectable format. The system enables the user to select from among a range of display formats that present different amounts of musical notation on the display of the musical score that the user is playing.

In general, in one aspect, the invention is a music system including an actuator which generates a plurality of actuation signals in response to input from a user; an audio synthesizer which generates audio tones in response to control signals; a memory storing a musical score, which is made up of a sequence of notes, each of which has an associated time stamp to identify a time at which it is supposed to be played by the user in the musical score; a video display unit; and a digital processor controlling the audio synthesizer and the video display unit. The digital processor is programmed to support a plurality of user selectable display formats each of which presents a different representation of the stored musical score when the stored musical score is being played. Each of the plurality of display formats indicates to the user when the actuation signals of the plurality of actuation signals should be generated to cause the synthesizer to produce corresponding sounds of the stored musical score. The digital processor is also programmed to be responsive to a selection signal from the user identifying a selected one of the plurality of user-selectable display formats and to display the stored musical score using the selected display format. Also, the digital processor is programmed to receive the plurality of actuation signals from the actuator and generate a sequence of control signals therefrom; to map the plurality of actuation signals to a corresponding set of notes from among the sequence of notes; and to produce the sequence of control signals from the corresponding set of notes. The sequence of control signals causes the synthesizer to generate sounds representing the corresponding set of notes.

In general, in another aspect, the invention is a control program tangibly stored on a digital storage medium for use with a music system that includes an actuator for generating a sequence of actuation signals in response to a corresponding sequence of activations of the actuator by a user, an audio component, a display screen, a digital processor receiving the sequence of actuation signals from the actuator and generating a corresponding sequence of control signals therefrom, and a digital storage device storing a sequence of note structures representing a musical score. The control program is configured to cause the digital processor to perform the functions of: supporting a plurality of user selectable display formats each of which presents a different representation of the stored musical score when the stored musical score is being played, each of the plurality of display formats indicating to the user when the actuation signals of the plurality of actuation signals should be generated to cause the audio component to produce corresponding sounds of the stored musical score; responding to a selection signal from the user identifying a selected one of the plurality of user-selectable display formats; displaying the stored musical score using the selected display format; mapping the plurality of actuation signals from the actuator to a corresponding set of notes from among the sequence of notes; and producing the sequence of control signals from the corresponding set of notes. The sequence of control signals causes the audio component to generate sounds representing the corresponding set of notes.

Other embodiments may include one or more of the following features. The plurality of user selectable display formats are ordered in terms of information content from lowest information content to highest information content (e.g. they are ordered in terms of music notation content presented in the display from a lowest amount of music notation to a highest amount of music notation). The plurality of user selectable display formats includes a first display format which when selected causes the program to display on the display screen a trace of markers as a function of time, wherein each of the markers within the trace of markers indicates a time at which the user is supposed to cause the actuator to generate at least one of the actuation signals of the plurality of actuation signals in order to cause the audio component to play a corresponding one of the sequence of notes of the musical score. The trace of markers represents a period of time extending from before an actual elapsed time until after the actual elapsed time, the actual elapsed time being measured from a start of the musical score. Also, the program is further configured to display on the display screen an indicator marking a location of the actual elapsed time within the selected display format thereby indicating where the user is presently supposed to be within the musical score. In general, in still another aspect, the invention is a method such as is implemented by the music system and the programs described above.

In still yet another aspect, the invention is a control program tangibly stored on a digital storage medium for use with a music system and is configured to cause the digital processor to perform the functions of: supporting a plurality of user selectable display formats each of which presents a different representation of the stored musical score when the stored musical score is being played, each of the plurality of display formats indicating to the user when the actuation signals of the plurality of actuation signals should be generated to cause the audio component to produce corresponding sounds of the stored musical score; responding to a selection signal from the user identifying a selected one of the plurality of user-selectable display formats; and displaying the stored musical score using the selected display format.

An advantage of the invention is that it provides a useful mechanism for gradually introducing musically untrained people to a more formal musical notation. Along a similar vein, it further enhances the educational value of a category of musical devices that are typically sold as musical games.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
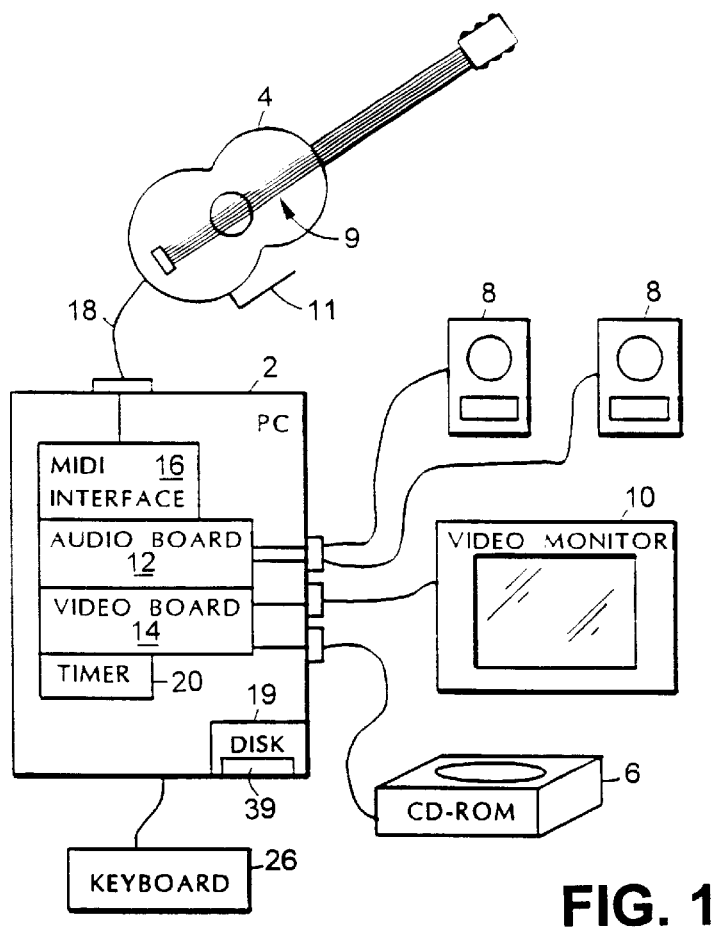
FIG. 1 is a block diagram of a virtual music system that incorporates the variable music notation display.

FIG. 1 shows a virtual music system which implements a user-selectable display format in accordance with the invention. The system includes among its basic components a Personal Computer (PC) 2; an actuator, which in the described embodiment is a MIDI guitar 4; and a CD-ROM player 6. Under control of PC 2, CD-ROM player 6 plays back an interleaved digital audio and video recording of a song that a user has selected as the music that he also wishes to play on guitar 4. Stored in PC 2 is a song data file (not shown in FIG. 1) that contains a musical score that is to be played by MIDI guitar 4. In this case, it corresponds to the guitar track of the same song that is being played on CD-ROM player 6.

MIDI guitar 4 is a commercially available instrument that includes a multi-element actuator, referred to more commonly as a set of strings 9, and a tremelo bar 11. Musical Instrument Digital Interface (MIDI) refers to a well known standard of operational codes for the real time interchange of music data. It is a serial protocol that is a superset of RS-232. When an element of the multi-element actuator (i.e., a string) is struck, guitar 4 generates a set of digital opcodes describing that event. Similarly, when tremelo bar 11 is used, guitar 4 generates an opcode describing that event. As the user plays guitar 4, it generates a serial data stream of such "events" (i.e., string activations and tremelo events) that are sent to PC 2 which uses them to access and thereby play back the relevant portions of the stored song in PC 2. PC 2 mixes the guitar music with the audio track from CD-ROM player and plays the resulting music through a set of stereo speakers 8 while at the same time displaying the accompanying video image on a video monitor 10 that is connected to PC 2.

The CD-ROM disc that is played on player 6 contains an interleaved and synchronized video and audio file of music which the guitar player wishes to play. The video track could, for example, show a band playing the music, and the audio track would then contain the audio mix for that band with the guitar track omitted. The software that runs on the processor has an API (Application Program Interface) that enables the user to initiate and control the running of these Video-audio files from a C program.

PC 2, which includes a processor, RAM, and a hard drive 19, uses a Windows Operating System. An application program 39, which is stored in drive 19 and runs on PC 2, implements the functionality of the virtual instrument and the display functions as described below.

Figure 3:
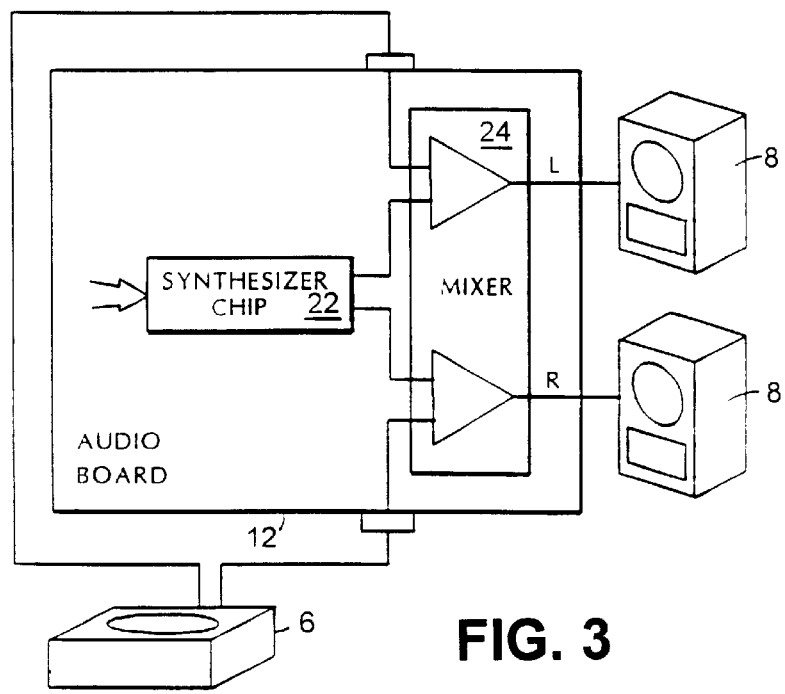
FIG. 3 is a block diagram of the audio processing plug-in board that is shown in the block diagram of FIG. 1.

PC 2 is also equipped with several plug-in boards. There is an audio processing plug-in board 12 (also shown in FIG. 3), which has a built in programmable MIDI synthesizer 22 and a digitally programmable analog 2-channel mixer 24. There is also a video decompression/accelerator board 14 for creating full-screen, full motion video from the video signal coming from CD-ROM player 6. And there is a MIDI interface card 16 to which MIDI guitar 4 is connected through a MIDI cable 18. PC 2 also includes a programmable timer chip 20 that updates a clock register every millisecond.

On audio processing plug-in board 12, a synthesis chip 22 synthesizes tones of specified pitch and timbre in response to a serial data stream that is generated by MIDI guitar 4 when it is played. The synthesis chip includes a digital command interface that is programmable from an application program running under the operating system. The digital command interface receives MIDI formatted data that indicate what notes to play at what velocity (i.e., volume). It interprets the data that it receives and causes the synthesizer to generate the appropriate notes having the appropriate volume. Analog mixer 24 mixes audio inputs from CD-ROM player 6 with the synthesis chip generated waveforms to create a mixed stereo output signal that is sent to speakers 8. Video decompression/accelerator board 14 handles the accessing and display of the video image that is stored on a CD-ROM disc along with a synchronized audio track. MIDI interface card 16 processes the signal from MIDI guitar 4.

When MIDI guitar 4 is played, it generates a serial stream of data that identifies what string was struck and with what force. This serial stream of data passes over cable 18 to MIDI interface card 16, which registers the data chunks and creates interrupts to the processor. The MIDI Interface card's device driver code which is called as part of the processor's interrupt service, reads the MIDI Interface card's registers and puts the MIDI data in an application program accessible buffer.

Further details on a music system that operates in a manner similar to what is described herein can be found in the above-mentioned patent, i.e., U.S. Pat. No. 5,491,297.

The song data file that is stored in PC 2 contains all of the notes of the virtual guitar track in the sequence in which they are to be played. Typically, the song data is partitioned into a sequence of frames. A frame may include one note, multiple notes, or even many notes or chords of the song. Each frame has a start time and an end time, which locates the frame within the music that will be played. The start time of any given frame is equal to the end time of the previous frame plus some small period of time, e.g. 1 millisecond.

The guitar player is able to "play" or generate only those notes that are within the "current" frame. The current frame is that frame whose start time and end time brackets the current time, i.e., the time that has elapsed since the song began. Within the current frame, if there is more than one note, the guitar player can play any number of those notes that are present but only in the order in which they appear in the frame. The pace at which they are played or generated within the time period associated with the current frame is, however, determined by the user. In addition, the user by controlling the number of string activations also controls both the number of notes of a chord that are generated and the number of notes within the frame that actually get generated. Thus, for example, the player can play any desired number of notes of a chord in a frame by activating only that number of strings, i.e., by strumming the guitar. If the player does not play the guitar during a period associated with a given frame, then none of the music within that frame will be generated. The next time the user strikes or activates a string, then the notes of a later frame, i.e., the new current frame, will be generated.

Note that the pitch of the sound that is generated is determined solely by information that is stored the data structures containing the song data. Thus, the guitar player needs only activate the strings. In the described embodiment, the frequency at which the string vibrates has no effect on the sound generated by the virtual music system. That is, the player need not fret the strings while paying in order to produce the appropriate sounds.

It should also be noted that the decision about where to place the frame boundaries within the song image is a somewhat subjective decision, which depends upon the desired sound effect and flexibility that is given to the user. Similarly, the number of notes that are used from an actual guitar track is also a subjective decision. Generally, to avoid creating a music track that is too complex for the untrained user some subset of the notes will be used, enough to preserve the underlying essence of the music, e.g. the melody, without making it too complicated for the novice. There are undoubtedly many ways to make these decisions. In the case of locating frame boundaries, chord changes could, for example, be used as a guide for where to place the frame boundaries. Much of the choice should be left to the discretion of the music arranger who builds the database. Alternatively, a useful approach is to limit a frame to no more than one note and the associated harmony notes, if harmony notes are includes. As a rule of thumb, however, if the frames are designed to have more than one note within them they should not be so long that the music when played with the virtual instrument can get far out of alignment with the accompaniment.

The application program which implements the virtual instrument on the computer is also programmed to offer user-selectable display formats for display of music information on video monitor 10 while the music is being played. In the described embodiment, the system offers five levels of music notation from which the user can select, referred to herein as Level 1 through Level 5. The selected level establishes the format and sophistication of the information that is displayed to the user. The graphical user interface that is presented to the user via the display screen includes control buttons, or a comparable selection mechanism, that enables the user to select through the software the desired display level or format.

Level 1, the simplest level of display, includes the most basic information about the song that the user is playing. That is, Level 1 presents the most crude and simple form of music notation that is available through the system. Each higher level offers the user a display that presents an increasingly more sophisticated music notation in comparison to the next lower level. The different levels are designed to represent levels of increasing complexity and to provide a step-by-step or graduated method for teaching users standard music notation (i.e., the formal written language of music). In general, as will become apparent below, in higher levels more music notation information is added until a relatively more complete formal music notation is presented. A very important aspect of the user selectable display format is that it enables the user to increase the display of music notation one level at a time and at the users discretion until the user becomes familiar with the more formal music notation that is used by musicians. Naturally, a new user who is unfamiliar with music and formal music notation is likely to elect Level 1 when first using the system. As the user's skills increase or as the user's experience with the system increases, the user is likely to want to select a more complicated visual display of the music information.

The display format that is associated with each of the user-selectable levels will now be described in greater detail.

Figure 2A:
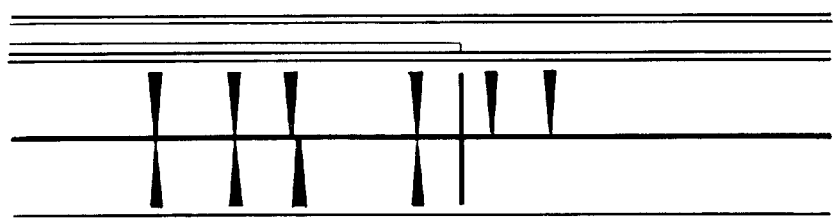
FIG. 2A is an example of a Level 1 display format.

When Level 1 is selected, the system presents two basic pieces of information to the user, namely, a trace of the signals that are supposed to be generated by the user and a trace of the signals that are actually generated by the user. Referring to FIG. 2A, the first signal trace is a series of upward extending "spikes" which are located at the times at which the user is suppose to generate an actuation signal, i.e., the times at which the user is supposed play the corresponding note on his or her "instrument". The second trace is a series of downwardly extending "spikes" which indicate precisely when the user did generate the actuation signals. At the center of the display there is a cursor which identifies actual time within the music assuming the music is being played as it should be played. In the depicted embodiment, the cursor is stationary and the upper trace moves to the left. When a spike in the upper trace reaches the cursor, this indicates when the user is supposed to generate the actuation signal. Whenever the user does, in fact, generate an actuation signal, the system produces a downward extending spike at the cursor and this generated spike moves to the left along with the upper spikes.

The display of Level 1 is similar to what was described in U.S. Pat. No. 5,491,297, entitled "Music Instrument Which Generates A Rhythm EKG", issued Feb. 13, 1996, and incorporated herein by reference.

Figure 2B:
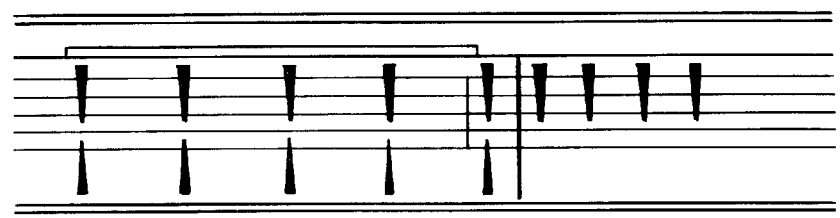
FIG. 2B is an example of a Level 2 display format.

Referring to FIG. 2B, in Level 2 the system presents the first indication of standard music notation. This display format shows musical staffs with lines and spaces. In addition, when the upward spikes occur, they occur so as to appear rhythmically correct. In other words, they appear exactly where they would appear if the spikes were actual music notes.

Figure 2C:
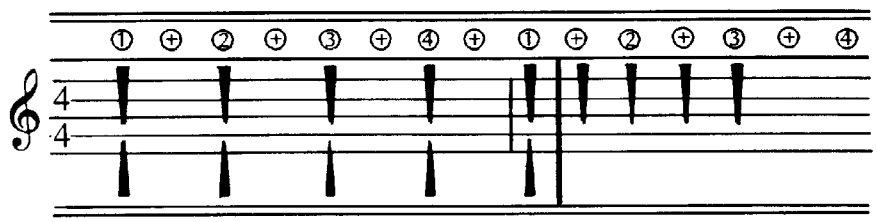
FIG. 2C is an example of a Level 3 display format.

Referring to FIG. 2C, in Level 3 the system adds incremental features to the display such as counting methods (above the staff), clefs and the time signature. In the example illustrated the G clef has been introduced.

At this level, the software also offers the user an option of selecting playback of a voice of somebody who counts out loud, like a music teacher, to assist the user in understanding the beat pattern of the music.

Figure 2D:
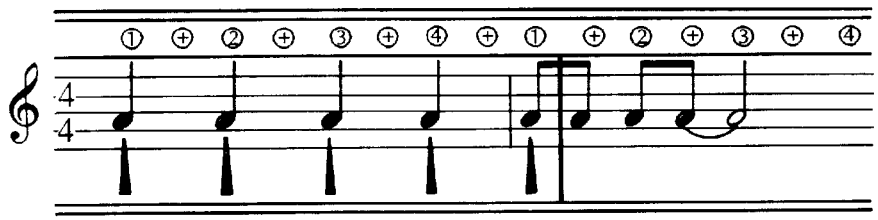
FIG. 2D is an example of a Level 4 display format.

Referring to FIG. 2D, in Level 4 the system replaces the spikes with the actual musical notes, while still keeping the prior features that existed in Level 3, e.g. downwardly generated spikes, etc.

Figure 2E:
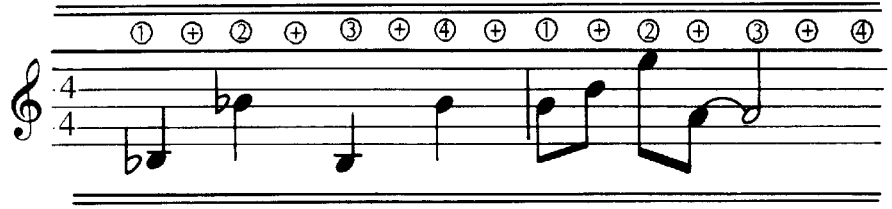
FIG. 2E is an example of a Level 5 display format.

Finally, in Level 5 the system introduces melodic changes in the piece of music (see FIG. 2E). The melody can be the lead melody or any other desired melody or harmony part.

Note that Level 5 also does not include the cursor. However, that is optional. In the described embodiment, the software provides the user with the capability to turn on and turn off the cursor. Of course, in the lower levels, e.g. Levels 1 and 2, the user will want the cursor to appear on the display. Indeed, it is likely that only at Level 5 and after having become very familiar with standard music notation will the user want to turn the cursor off.

The information that is to be displayed at the various levels is stored in the data structures of the stored musical score. Depending on the level selected by the user, the program selects the appropriate stored information and displays it to generate the display format selected by the user. The note-specific information can be stored as part of the corresponding data structure for that note. Other information that is not note specific can be stored in other data structures that are in addition to the note data structures.

A number of embodiments of the invention have been described. Nevertheless, it will be understood that various modifications may be made without departing from the spirit and scope of the invention. For example, in the described embodiment, the actuator is a MIDI guitar. However, it can be any device that can be configured to generate the requisite actuation signals can be used. One example of how simple the input device can actually be is described in U.S. Pat. No. 5,670,729, entitled "Virtual Music Instrument with a Novel Input Device", issued Sep. 23, 1997, and incorporated herein by reference. Or it could be a drum stick that is appropriately modified to generate the required signal upon percussive contact with another object. Or it could be one or more keys on a keyboard attached to the computer. Or it could be one of the keys on a mouse device.

Also in the above-described embodiment, the cursor, which identified "current time", remained fixed while the underlying series of "spikes" or the representation of the musical score moved to the left as time progressed. Of course an alternative is to fix the musical score and allow the cursor to move to the right.

It should be understood that the list of alternative embodiments of various aspects of the system is meant to convey the breadth of the range of options that are available in implementing the invention and is not meant to be limiting in any way to only those examples which have been selected.

Accordingly, other embodiments are within the scope of the following claims:

What is claimed is:

1. A music system comprising:

an actuator which generates a plurality of actuation signals in response to input from a user;

an audio synthesizer which generates audio tones in response to control signals;

a memory storing a musical score, said stored musical score comprising a sequence of notes, each of which has an associated time stamp to identify a time at which it is supposed to be played by said user in said musical score;

a video display unit;

a digital processor controlling said audio synthesizer and said video display unit, said digital processor programmed to support a plurality of user selectable display formats each of which presents a different representation of the stored musical score when the stored musical score is being played, each of said plurality of display formats indicating to the user when the actuation signals of said plurality of actuation signals should be generated to cause the synthesizer to produce corresponding sounds of the stored musical score;

said digital processor programmed to be responsive to a selection signal from the user identifying a selected one of said plurality of user-selectable display formats;

said digital processor programmed to display the stored musical score using the selected display format;

said digital processor programmed to receive said plurality of actuation signals from said actuator and generate a sequence of control signals therefrom, said digital processor programmed to map the plurality of actuation signals from said actuator to a corresponding set of notes from among said sequence of notes; and said digital processor programmed to produce the sequence of control signals from the corresponding set of notes, said sequence of control signals causing said synthesizer to generate sounds representing the corresponding set of notes.

2. A control program tangibly stored on a digital storage medium for use with a music system that includes an actuator for generating a sequence of actuation signals in response to a corresponding sequence of activations of the actuator by a user, an audio component, a display screen, a digital processor receiving said sequence of actuation signals from said actuator and generating a corresponding sequence of control signals therefrom, and a digital storage device storing a sequence of note structures representing a musical score, wherein said digital storage medium is readable by the digital processor, said control program being configured to operate the digital processor to perform the functions of:

supporting a plurality of user selectable display formats each of which presents a different representation of the stored musical score when the stored musical score is being played, each of said plurality of display formats indicating to the user when the actuation signals of said plurality of actuation signals should be generated to cause the audio component to produce corresponding sounds of the stored musical score;

responding to a selection signal from the user identifying a selected one of said plurality of user-selectable display formats;

displaying the stored musical score using the selected display format;

mapping the plurality of actuation signals from said actuator to a corresponding set of notes from among said sequence of notes; and producing the sequence of control signals from the corresponding set of notes, said sequence of control signals causing said audio component to generate sounds representing the corresponding set of notes.

3. The control program of claim 2 wherein the plurality of user selectable display formats are ordered in terms of information content from lowest information content to highest information content.

4. The control program of claim 2 wherein the plurality of user selectable display formats are ordered in terms of music notation content presented in the display from a lowest amount of music notation to a highest amount of music notation.

5. The control program of claim 2 wherein the plurality of user selectable display formats includes a first display format and when said first display format is selected by the user, the program is configured to display on the display screen a trace of markers as a function of time, wherein each of the markers within said trace of markers indicates a time at which the user is supposed to cause said actuator to generate at least one of the actuation signals of said plurality of actuation signals in order to cause the audio component to play a corresponding one of the sequence of notes of said musical score, said trace of markers representing a period of time extending from before an actual elapsed time until after the actual elapsed time, the actual elapsed time being measured from a start of the musical score.

6. The control program of claim 2 wherein said program is further configured to display on said display screen an indicator marking a location of the actual elapsed time within the selected display format thereby indicating where the user is presently supposed to be within the musical score.

7. A method of operating a music system that includes an actuator for generating a sequence of actuation signals in response to a corresponding sequence of activations of the actuator by a user, an audio component, a display screen, and a digital storage device storing a sequence of note structures representing a musical score, said method comprising the steps of:

supporting a plurality of user selectable display formats each of which presents a different representation of the stored musical score when the stored musical score is being played, each of said plurality of display formats indicating to the user when the actuation signals of said plurality of actuation signals should be generated to cause the synthesizer to produce corresponding sounds of the stored musical score;

responding to a selection signal from the user identifying a selected one of said plurality of user-selectable display formats;

displaying the stored musical score on the display screen using the selected display format;

receiving said plurality of actuation signals from said actuator and generating a sequence of control signals therefrom, mapping the plurality of actuation signals from said actuator to a corresponding set of notes from among said sequence of notes; and producing the sequence of control signals from the corresponding set of notes, said sequence of control signals causing said audio component to generate sounds representing the corresponding set of notes.

8. A control program tangibly stored on a digital storage medium for use with a music system that includes an actuator for generating a sequence of actuation signals in response to a corresponding sequence of activations of the actuator by a user, an audio component, a display screen, a digital processor, and a digital storage device storing a musical score, wherein said digital storage medium is readable by the digital processor, said control program being configured to operate the digital processor to perform the functions of:

supporting a plurality of user selectable display formats each of which presents a different representation of the stored musical score when the stored musical score is being played, each of said plurality of display formats indicating to the user when the actuation signals of said plurality of actuation signals should be generated to cause the audio component to produce corresponding sounds of the stored musical score;

responding to a selection signal from the user identifying a selected one of said plurality of user-selectable display formats; and displaying the stored musical score using the selected display format.

* * * * *